(12) United States Patent
Tobari et al.

(10) Patent No.: US 6,954,050 B2
(45) Date of Patent: Oct. 11, 2005

(54) CONTROL METHOD AND CONTROL DEVICE OF PERMANENT-MAGNET TYPE SYNCHRONOUS MOTOR

(75) Inventors: Kazuaki Tobari, Hitachiota (JP); Tsunehiro Endo, Hitachiota (JP); Hidefumi Shirahama, Hitachi (JP); Yoshiyuki Taguchi, Funabashi (JP); Tomofumi Okubo, Narashino (JP)

(73) Assignees: Hitachi, Ltd., Tokyo (JP); Hitachi Industrial Equipment Systems Co., Ltd., Chiba (JP)

( * ) Notice: Subject to any disclaimer, the term of this patent is extended or adjusted under 35 U.S.C. 154(b) by 0 days.

(21) Appl. No.: 10/784,803

(22) Filed: Feb. 24, 2004

(65) Prior Publication Data
US 2004/0207358 A1 Oct. 21, 2004

(30) Foreign Application Priority Data
Mar. 24, 2003 (JP) ........................................ 2003-080439

(51) Int. Cl.[7] ................................................ H02P 1/30
(52) U.S. Cl. ........................ 318/717; 318/453; 318/459; 318/714; 318/715
(58) Field of Search ................................ 318/717, 714, 318/715, 453, 459

(56) References Cited

U.S. PATENT DOCUMENTS

| | | | | |
|---|---|---|---|---|
| 5,796,228 A | * | 8/1998 | Kojima et al. | 318/605 |
| 6,208,109 B1 | * | 3/2001 | Yamai et al. | 318/716 |
| 6,259,226 B1 | * | 7/2001 | Kaitani et al. | 318/798 |
| 6,531,843 B2 | * | 3/2003 | Iwaji et al. | 318/727 |
| 6,690,137 B2 | * | 2/2004 | Iwaji et al. | 318/700 |
| 6,727,675 B2 | * | 4/2004 | Yoshimoto et al. | 318/700 |

* cited by examiner

*Primary Examiner*—Rita Leykin
(74) *Attorney, Agent, or Firm*—Dickstein Shapiro Morin & Oshinsky LLP

(57) ABSTRACT

The object of the invention is to inhibit the axial displacement caused by the insufficiency of a control response angular frequency of a frequency arithmetic unit of a synchronous motor and realize high-precision torque control also in acceleration/deceleration. To achieve the object, the axial displacement of the synchronous motor caused by the insufficiency of the control response angular frequency of the frequency arithmetic unit is estimated in consideration of the control response angular frequency and input $\Delta\theta c3$ (=$\Delta\theta c1+\Delta\theta c2$) including an estimated value $\Delta\theta c2$ in addition to an axial displacement operated value $\Delta\theta c1$ to the frequency arithmetic unit is acquired. Hereby, even if the frequency arithmetic unit has an insufficient control response angular frequency, the quantity of axial displacement which will be caused by the insufficiency is estimated as a second axial displacement signal $\Delta\theta c2$, is added and input. Therefore, actual axial displacement $\Delta\theta c1$ of the synchronous motor is stable at a value substantially close to zero.

20 Claims, 11 Drawing Sheets

CONTROL METHOD AND CONTROL DEVICE OF PERMANENT-MAGNET TYPE SYNCHRONOUS MOTOR

FIELD OF THE INVENTION

The present invention relates to a control method and a control device of a permanent-magnet type synchronous motor and more particularly to a control method and a control device of a permanent-magnet type synchronous motor improved in torque control technique.

BACKGROUND OF THE INVENTION

For the control technique of a conventional type permanent-magnet type synchronous motor provided with a polar position sensor, there is a control device disclosed in a patent document 1. The control device utilizes positional information from the polar position sensor for a limiting value of a rotational phase directed value and prevents the loss of synchronism by the rapid change of a load and others.

Besides, in a patent document 2, for a control device without a position sensor of a synchronous motor, technique for calculating axial displacement based upon a current sensed value and a voltage directed value to a power converter and adjusting an output frequency of the converter based upon the axial displacement is disclosed.

[Patent Document 1]
JP-A 324881/2000 (Abstract, Paragraph 0011 and others)
[Patent Document 2]
JP-A 251889/2001 (Claim 9, Paragraph 0105 and others)

In the prior art of the patent document 1, the axial displacement is operated, however, in a torque control system, the axial displacement is used only for the limiting value of the rotational phase directed value acquired by integrating a frequency directed value given from a host and high-precision torque control cannot be expected.

Besides, in the prior art of the patent document 2, in case it is difficult to give sufficient high-speed responsibility to a frequency arithmetic unit for operating a frequency based upon axial displacement, torque control precision particularly in acceleration/deceleration is not enough.

SUMMARY OF THE INVENTION

An object of the present invention is to provide a control method and a control device of a permanent-magnet type synchronous motor which can also realize high-precision torque control in acceleration/deceleration.

For the fact that it is difficult to give sufficient high-speed responsibility to the frequency arithmetic unit for operating a frequency based upon axial displacement in the patent document 2, such causes are considered as ① the limit of the sampling speed of an adoptable microcomputer, ② the stability of a control system and ③ the securement of robustness. In this case, axial displacement $\Delta\theta c$ in the synchronous motor, that is, deviation between a rotational phase direction $\theta c^*$ and an actual rotational phase $\theta c$ of a rotor of the motor is determined according to a control response angular frequency of the frequency arithmetic unit as described in detail later. When the control response angular frequency is low, axial displacement $\Delta\theta c$ increases and the motor torque proportional to its cosine value (cos $\Delta\theta c$) decreases. Therefore, particularly, correspondence to the rapid change of a load becomes impossible and the torque control precision in acceleration/deceleration of the permanent-magnet type synchronous motor is not enough.

Then, to solve the above-mentioned problem the invention is based upon the control over a permanent-magnet type synchronous motor of creating a frequency direction $\omega_1^*$ of alternating current fed to a motor based upon the axial displacement of the permanent-magnet type synchronous motor in a frequency arithmetic unit and of feeding alternating current of a variable frequency and variable voltage from a power converter to the motor according to the respective output voltage directions $Vd^*$, $Vq^*$ of a d axis and a q axis based upon the frequency direction $\omega_1^*$ and a rotational phase direction $\theta c^*$, and is characterized in that the axial displacement of the motor is operated as a first axial displacement signal $\Delta\theta c1$ using information acquired from a control system, axial displacement which will occur in the motor because of the insufficiency of the control response angular frequency of the frequency arithmetic unit is estimated as a second axial displacement signal $\Delta\theta c2$ and a third axial displacement signal acquired by adding the first and second axial displacement signals is input to the frequency arithmetic unit.

That is, the axial displacement of the synchronous motor caused by the insufficiency of the control response angular frequency of the frequency arithmetic unit is estimated in consideration of the control response angular frequency and is added to the input of the frequency arithmetic unit. Hereby, axial displacement which will occur because of the insufficiency is estimated as the second axial displacement signal $\Delta\theta c2$, is added and input even to the frequency arithmetic unit of the insufficient control response angular frequency. Therefore, in the control system according to the invention, the first axial displacement signal $\Delta\theta c1$ which represents the axial displacement of the actual synchronous motor is stable at a value substantially close to zero. As a result, the control method and the control device of the permanent-magnet type synchronous motor which can also realize high-precision torque control in acceleration/deceleration can be provided.

In this case, it is desirable that the second axial displacement signal $\Delta\theta c2$ is calculated based upon the frequency direction $\omega_1^*$ or the rotational frequency $\omega 1$ of the synchronous motor by an incomplete differential by a control constant based upon a control response angular frequency $\omega c_{PLL}$ in the frequency arithmetic unit, or is estimated based upon a current value Iqc on the q axis (equivalent to a torque axis) of a rotatory coordinate system or its directed value $Iq^*$ in consideration of the control constant.

The other objects and the other characteristics of the invention will be clarified by the description of the following embodiments.

DETAILED DESCRIPTION OF THE PREFERRED EMBODIMENTS

Figure 1:
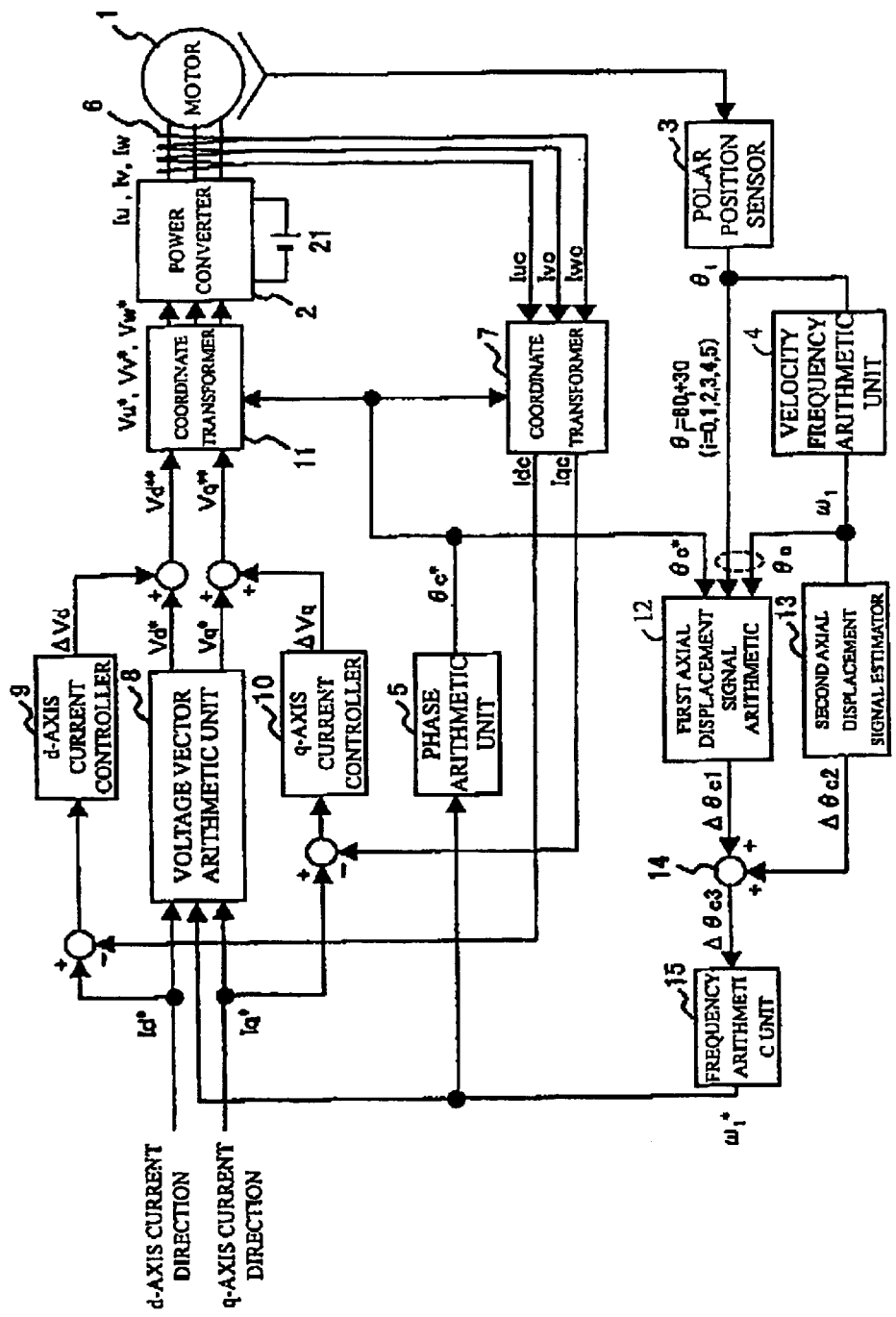
FIG. 1 is a block diagram showing a control device of a permanent-magnet type synchronous motor equivalent to a first embodiment of the invention.

Referring to the drawings, embodiments of the invention will be described in detail below.

First Embodiment:

FIG. 1 is a block diagram showing the configuration of a control device of a permanent-magnet type synchronous motor equivalent to a first embodiment of the invention. The permanent-magnet type synchronous motor 1 is fed three-phase current of variable voltage and a variable frequency from a power converter 2 and is controlled at variable speed. The power converter 2 converts and outputs dc voltage from a direct voltage source 21 to three-phase alternating output voltage proportional to voltage directed values Vu*, Vv*, Vw*. A polar position sensor 3 senses a positional sensed value θi every 60° of electrical angle of the motor 1. A velocity frequency arithmetic unit 4 operates the velocity frequency $\omega_1$ of the motor 1 based upon the positional sensed value θi.

A phase arithmetic unit 5 operates a rotational phase direction θc* to the motor based upon a frequency directed value $\omega_1{}^*$. A current sensor 6 senses three-phase currents Iu, Iv, Iw and outputs sensed values Iuc, Ivc, Iwc. A coordinate transformer 7 operates the current sensed values Idc, Iqc of a d-axis and a q-axis based upon the three-phase current sensed values Iuc, Ivc, Iwc and the rotational phase direction θc*. A voltage vector arithmetic unit 8 operates voltage reference values Vd*, Vq* based upon a motor constant, current directed values Id*, Iq* and the frequency directed value $\omega_1{}^*$. A d-axis current controller 9 outputs correction voltage ΔVd according to deviation between the d-axis current directed value Id* and the d-axis current sensed value Idc. A q-axis current controller 10 outputs correction voltage ΔVq according to deviation between the q-axis current directed value Iq* and the q-axis current sensed value Iqc. A coordinate transformer 11 operates and outputs three-phase alternating voltage directed values Vu*, Vv*, Vw* based upon the voltage reference values Vd*, Vq*, the respective sums Vd, Vq of the respective outputs ΔVd, ΔVq of the current controllers and the rotational phase direction θc*. A first axial displacement signal (Δθc1) arithmetic unit 12 operates a first axial displacement signal Δθc1 (=θc*−θc) based upon the rotational phase direction θc*, the positional sensed value θi and the velocity frequency $\omega_1$, the details of which will be described later. A second axial displacement signal estimator 13 which is a principal part of the invention operates a second axial displacement signal Δθc2 based upon the velocity frequency $\omega_1$ by an incomplete differential. An adder 14 adds the first axial displacement signal Δθc1 and the second axial displacement signal Δθc2 and operates a third axial displacement signal Δθc3. A frequency arithmetic unit 15 operates the frequency directed value $\omega_1{}^*$ based upon the third axial displacement signal Δθc3 by a proportional integral.

Prior to the description of the first embodiment, the torque of the motor 1 in case displacement exists between a control axis (dc–qc axes) and an actual axis (d–q axes) of the motor will be described below. That is, the torque of the motor in case displacement Δθ exists between the rotational phase direction θc* operated on the control axis and a rotational phase θ inside the motor is led. First, the motor torque on the d-q axis is expressed by an expression (1).

$$\tau_m = \frac{3}{2} \cdot P_m \cdot (Ke \cdot Iq + (Ld - Lq) \cdot Id \cdot Iq) \tag{1}$$

In the above-mentioned expression, $P_m$ denotes a motor polar logarithm, Ke denotes an induced voltage constant, Ld denotes the inductance of the d axis, Lq denotes the inductance of the q axis, Id denotes d-axis current on the actual axis and Iq denotes q-axis current on the actual axis.

A coordinate transformation matrix from the control axis (dc–qc) to the actual axis (d–q) is expressed by an expression (2) and when a d-axis current directed value Id* is set to zero and current control is made, currents Id, Iq on the actual axis can be expressed by an expression (3).

$$\begin{bmatrix} d \\ q \end{bmatrix} = \begin{bmatrix} \cos\Delta\theta & -\sin\Delta\theta \\ \sin\Delta\theta & \cos\Delta\theta \end{bmatrix} \cdot \begin{bmatrix} dc \\ qc \end{bmatrix} \tag{2}$$

$$\begin{bmatrix} Id \\ Iq \end{bmatrix} = \begin{bmatrix} \cos\Delta\theta & -\sin\Delta\theta \\ \sin\Delta\theta & \cos\Delta\theta \end{bmatrix} \cdot \begin{bmatrix} 0 \\ Iqc \end{bmatrix} \tag{3}$$

When the expression (3) is incorporated with the expression (1), an expression (4) is acquired.

$$\tau_m = \frac{3}{2} \cdot P_m \cdot \cos\Delta\theta \cdot Iqc \cdot (Ke - (Ld - Lq) \cdot \sin\Delta\theta \cdot Iqc) \tag{4}$$

It is known from the expression (4) that when axial displacement Δθ occurs, a "cos Δθ·Iqc" component decreases as described above even if a q-axis current sensed value Iqc is equal to a directed value and the motor torque $\tau_m$ decreases. That is, to generate the motor torque equal to the directed value, voltage and a phase are required to be optimumly controlled as follows.

(1) Voltage Control:

The output voltage of the converter is controlled so that the q-axis current sensed value Iqc is equivalent to the q-axis current directed value Iq* proportional to the direction of the torque.

(2) Phase Control:

The output phase of the power converter is controlled so that axial displacement Δθ possibly approaches zero, that is, cos Δθ=1.

Next, the basic operation of vector control for realizing the above-mentioned "(1) voltage control" will be described The currents Iq, Id of the motor are controlled according to the q-axis current directed value Iq* and the d-axis current directed value Id* respectively proportional to the direction of the torque given from the host. Therefore, in a voltage vector arithmetic unit 8, the voltage reference values Vd*, Vq* of the d-axis and the q-axis are operated as shown in an expression (5) beforehand and the output voltage of the converter 2 is controlled.

$$\begin{cases} Vd^* = R_1^* \cdot Id^* - \omega_1^* \cdot Lq^* \cdot Iq^* \\ Vq^* = R_1^* \cdot Iq^* + \omega_1^* \cdot Ld^* \cdot Id^* + \omega_1^* \cdot Ke^* \end{cases} \quad (5)$$

In the above-mentioned expression, R1* denotes a set value of resistance, Ld*, Lq* denote set values of the inductance of the d-axis and the q-axis, Ke* denotes a set value of an induced voltage constant and $\omega_1^*$ denotes a directed value of a frequency.

The current values Idc, Iqc of the d-axis and the q-axis are operated based upon the three-phase alternating current sensed values Iuc, Ivc, Iwc sensed by the current sensor 6 and the rotational phase direction θc*. Correction voltage signals ΔVd, ΔVq according to the deviation of current are calculated so that these current signals are equal to each directed value by the d-axis and q-axis current controllers 9, 10, are added to the voltage reference values Vd*, Vq* and the output voltage of the converter is corrected. As a result, even if the set values (R1*, Ld*, Lq*, Ke*) set by the voltage vector arithmetic unit 8 and actual values (R1, Ld, Lq, Ke) inside the motor do not accord, output voltage is controlled so that the current of the motor is in accord with the current directed value.

Next, the above-mentioned "(2) phase control" will be described. The polar position sensor 3 can grasp a polar position every electrical angle of 60 degrees and a positional sensed value θi by it is expressed by an expression (6) when i=0, 1, 2, 3, 4, 5.

$$\theta i = 60i + 30 \quad (6)$$

The velocity frequency arithmetic unit 4 calculates a velocity frequency $\omega_1$ of average speed in an interval of minimum 60 degrees based upon the positional sensed value θi using an expression (7).

$$\omega_1 = \frac{\Delta \theta_{60}}{\Delta t_{60}} \quad (7)$$

In the above-mentioned expression, $\Delta\theta_{60}$ denotes "θi−θ(i−1)" and $\Delta t_{60}$ denotes time until a position sensed signal in the interval of 60 degrees is sensed.

The first axial displacement signal arithmetic unit 12 and the second axial displacement signal estimator 13 which is the principal part of the invention will be described below.

Figure 2:
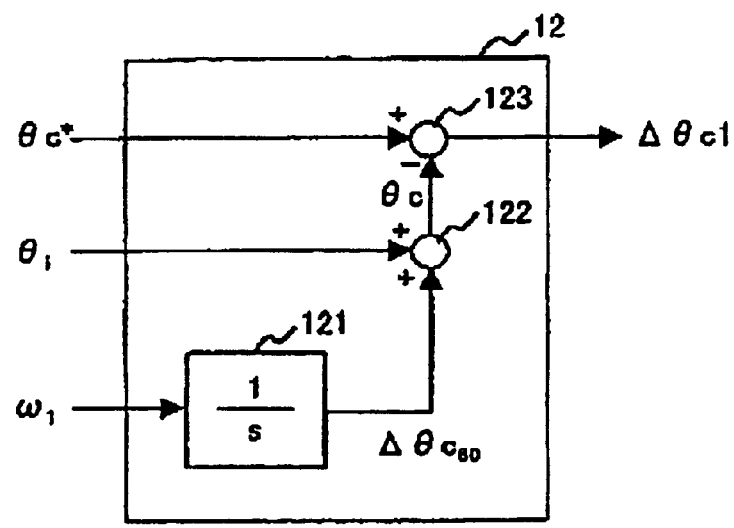
FIG. 2 shows the concrete configuration of a first axial displacement signal arithmetic unit 12 in the control device shown in FIG. 1.

FIG. 2 shows the concrete configuration of the first axial displacement signal arithmetic unit 12. The rotational phase direction θc*, the positional sensed value θi and the velocity frequency $\omega_1$ are input to the first axial displacement signal arithmetic unit 12. For the input velocity frequency $\omega_1$, average phase shift width $\Delta\theta c_{60}$ in the interval of 60 degrees is calculated in an integrator 121, is added to the positional sensed value θi in an adder 122 and a rotational phase operated value θc of the motor expressed in an expression (8) is acquired.

$$\theta c = \theta i + \frac{1}{s} \cdot \omega_1 \quad (8)$$

In the above-mentioned expression, s denotes Laplace operator.

The rotational phase operated value θc is input to a subtracter 123 together with the rotational phase direction θc* and the first axial displacement signal Δθc1 is output based upon difference between the rotational phase direction θc* and the rotational phase operated value θc in an expression (9).

$$\Delta\theta c1 = \theta c^* - \theta c \quad (9)$$

Figure 3:
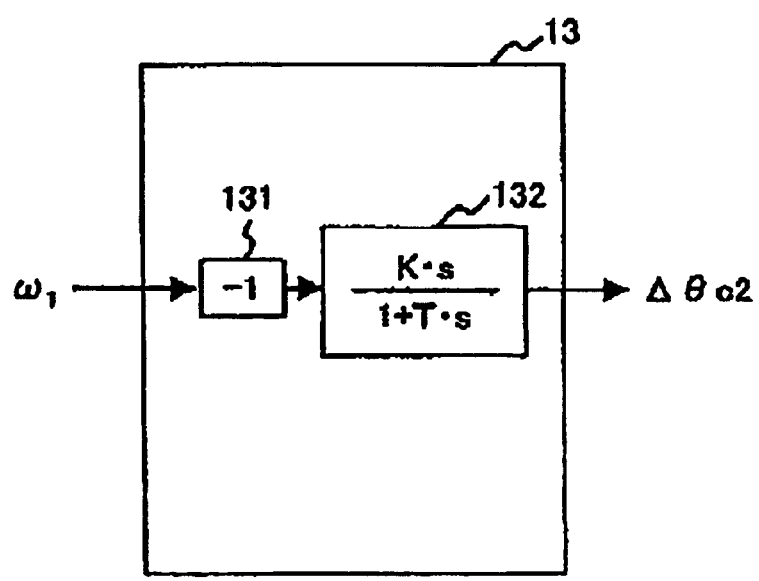
FIG. 3 shows the concrete configuration of a second axial displacement signal estimator 13 in the control device shown in FIG. 1.

FIG. 3 shows the concrete configuration of the second axial displacement signal estimator 13 which is the principal part of the invention. The velocity frequency $\omega_1$ is input to the second axial displacement signal estimator 13. The frequency $\omega_1$ is input to an incomplete differential arithmetic unit 132 the gain of which is K and the lag time constant of which is T after the frequency is multiplied by −1 in a coefficient unit 131, and the second axial displacement signal Δθc2 is operated according to an expression (10)

$$\Delta\theta c2 = -\frac{K \cdot s}{1 + T \cdot s} \cdot \omega_1 \quad (10)$$

The first axial displacement signal Δθc1 and the second axial displacement signal Δθc2 are added in the adder 14 and the third axial displacement signal Δθc3 is operated as shown in an expression (11).

$$\Delta\theta c3 = \Delta\theta c1 + \Delta\theta c2 \quad (11)$$

Figure 4:
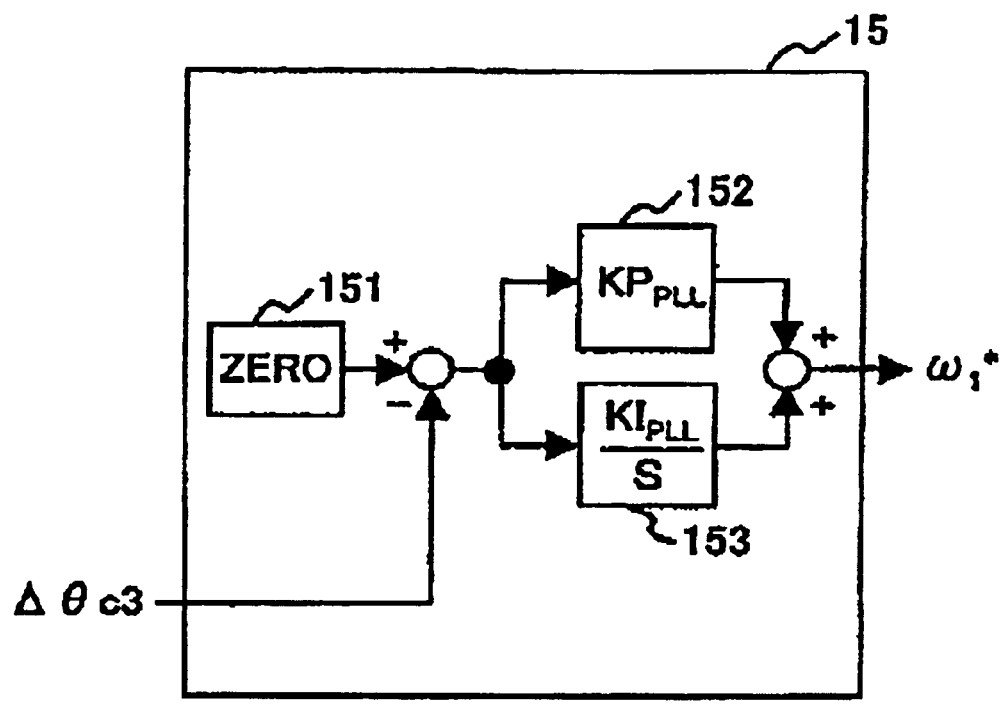
FIG. 4 shows the concrete configuration of a frequency arithmetic unit 15 in the control device shown in FIG. 1.

FIG. 4 shows the concrete configuration of the frequency arithmetic unit 15. An axial displacement director 151 directs zero and compares the third axial displacement signal Δθc3 with the axial displacement direction of zero. The axial displacement director adds a signal output from a proportion arithmetic unit 152 that multiplies its deviation signal by proportional gain $KP_{PLL}$ and a signal output from an integral arithmetic unit 153 that executes integral processing by multiplying the deviation signal by integral gain $KI_{PLL}$ and acquires an output frequency directed value $\omega_1^*$ of the power converter 2.

The phase arithmetic unit 5 generates the rotational phase direction θc* by integrating the frequency directed value $\omega_1^*$.

Next, the action of this embodiment will be described. First described is such a case that the second axial displacement signal Δθc2 is not added and only the first axial displacement signal Δθc1 is input to the frequency arithmetic unit 15 in the control device shown in FIG. 1.

The frequency arithmetic unit 15 operates the frequency directed value $\omega_1^*$ according to an expression (12).

$$\omega_1^* = -\Delta\theta c3 \cdot \left[ KP_{PLL} + \frac{KI_{PLL}}{s} \right] \quad (12)$$

In the above-mentioned expression, $KP_{PLL}$ denotes proportional gain and $KI_{PLL}$ denotes integral gain.

The control gains $KP_{PLL}$, $KI_{PLL}$ of the frequency arithmetic unit 15 are determined by a control response angular frequency $\omega c_{PLL}$ [rad/s] set by the arithmetic unit 15. $KP_{PLL}$, $KI_{PLL}$ are generally set as in an expression (13).

$$\begin{cases} KP_{PLL} = \omega c_{PLL} \\ KI_{PLL} = \frac{\omega c_{PLL}^2}{N} \end{cases} \quad (13)$$

In the above-mentioned expression, N denotes the ratio at a breakpoint of the proportional gain and the integral gain.

Next, relation between axial displacement Δθ which will be caused when the motor 1 is accelerated/decelerated is led by the control response angular frequency $\omega c_{PLL}$ set by the frequency arithmetic unit 15. Relation among torque $\tau_m$ generator by the motor, load torque $\tau_L$ and the rotational speed $\omega_r$ of the motor can be expressed in an expression (14)

$$\omega_r = (\tau_m - \tau_L) \cdot \frac{1}{Js} \cdot P_m \quad (14)$$

In the above-mentioned expression, J denotes an inertial value (synthetic value of the motor and the load).

When the expression (12) and the expression (14) are equal and the axial displacement operated value $\Delta\theta c1$ (in this case, it is supposed that $\Delta\theta c1 = \Delta\theta c3$) is arranged because the frequency direction $\omega_1{}^*$ follows (accords with) an actual rotational frequency $\omega_r$ of the motor by the operation of the frequency arithmetic unit 15, an expression (15) is acquired.

$$\Delta\theta c1 = -\frac{(\tau_m - \tau_L) \cdot \frac{1}{Js} \cdot P_m}{\left[ KP_{PLL} + \frac{KI_{PLL}}{s} \right]}$$

$$= -\frac{(\tau_m - \tau_L) \cdot \frac{1}{J} \cdot P_m \cdot \frac{1}{KI_{PLL}}}{\left[ 1 + \frac{KP_{PLL}}{KI_{PLL}} \cdot s \right]}$$

$$= -\frac{(\tau_m - \tau_L) \cdot \frac{1}{J} \cdot P_m \cdot \frac{1}{\omega c_{PLL}^2}}{1 + \frac{N}{\omega c_{PLL}} \cdot s} \quad (15)$$

For a steady-state value of the axial displacement operated value $\Delta\theta c1$, when Laplace operator s is zeroed in the expression (15), an expression (16) is acquired and it is known from the expression (16) that the axial displacement operated value $\Delta\theta c1$ (=$\Delta\theta c3$) is determined by "the control response angular frequency $\omega c_{PLL}$" of the frequency arithmetic unit 15.

$$\Delta\theta c1 = -(\tau_m - \tau_L) \cdot \frac{1}{J} \cdot P_m \cdot \frac{N}{\omega c_{PLL}^2} \quad (16)$$

That is, when the control response angular frequency $\omega c_{PLL}$ by the frequency arithmetic unit 15 is low, the axial displacement operated value $\Delta\theta c1$, that is, actual axial displacement increases and as clear from the expression (4), the motor torque $\tau_m$ decreases in proportion to its cosine value.

This is the problem left in the control device disclosed in the patent document 2.

Considered next is such a case that the first axial displacement signal $\Delta\theta c1$ and the second axial displacement signal $\Delta\theta c2$ are added, the third axial displacement signal $\Delta\theta c3$ is operated and is input to the frequency arithmetic unit 15 according to the invention. The second axial displacement signal $\Delta\theta c2$ means an estimated value of axial displacement which will occur because the frequency arithmetic unit 15 of a relatively low control response angular frequency $\omega c_{PLL}$ is used.

It is known from the expression (16) that differential torque between the motor torque and load torque can be detected and if a moment of inertia J is well-known, second axial displacement $\Delta\theta c2$ can be estimated. That is, the second axial displacement signal $\Delta\theta c2$ is estimated in an expression (17).

$$\Delta\theta c2 = -\frac{(\tau_m - \tau_L) \cdot \frac{1}{J^*} \cdot P_m \cdot \frac{N}{\omega c_{PLL}^2}}{1 + \frac{N}{\omega c_{PLL}} \cdot s} \quad (17)$$

In the above-mentioned expression, $J^*$ denotes an inertial set value.

If the velocity frequency $\omega_1$ is used in place of the differential torque $(\tau_M - \tau_L)$, an estimated value $\tau^\wedge$ of the differential torque $(\tau_M - \tau_L)$ can be operated using an expression (18).

$$\tau^\wedge = \frac{1}{P_m} \cdot J^* \cdot s \cdot \omega_1 \quad (18)$$

When the differential torque estimated value $\tau^\wedge$ acquired in the expression (18) is substituted for $(\tau_M - \tau_L)$ in the expression (17) and the second axial displacement signal $\Delta\theta c2$ is calculated in the expression (17), an expression (19) is acquired.

$$\Delta\theta c2 = -\frac{\frac{N}{\omega c_{PLL}^2} \cdot s}{1 + \frac{N}{\omega c_{PLL}} \cdot s} \cdot \omega_1 \quad (19)$$

If proportional gain K and a first-order lag time constant T are set as shown in an expression (20) based upon the expression (19), it is known that the second axial displacement signal $\Delta\theta c2$ can be estimated by the expression (10) in the first embodiment of the invention.

$$\begin{pmatrix} K = \frac{N}{\omega c_{PLL}^2} \\ T = \frac{N}{\omega c_{PLL}} \end{pmatrix} \quad (20)$$

The estimation using the expression (10) is executed by the second axial displacement signal estimator 13.

If the first axial displacement signal $\Delta\theta c1$ and the second axial displacement signal $\Delta\theta c2$ are added to acquire the third axial displacement signal $\Delta\theta c3$ and the frequency directed value $\omega_1{}^*$ is operated using the third axial displacement signal $\Delta\theta c3$, axial displacement can be substantially zeroed.

In this embodiment, the control method or the control device of the permanent-magnet type synchronous motor is configured as follows. First, as a premise, the frequency direction $\omega_1{}^*$ of alternating current fed to the motor 1 is created based upon the axial displacement signals of the permanent-magnet type synchronous motor 1 in the frequency arithmetic unit 15 so that axial displacement is reduced (for example, zeroed). Besides, the power converter 2 that feeds alternating current of a variable frequency and variable voltage to the motor 1 according to the output voltage directions $Vd^*$, $Vq^*$ of the d-axis and the q-axis based upon the frequency direction $\omega_1$ and the rotational phase direction $\theta c^*$ is provided. Axial displacement which is difference between the rotational phase direction $\theta c^*$ and an actual rotational phase $\theta c$ of the motor 1 is operated using information acquired from the control system as the first axial displacement signal $\Delta\theta c1$ (a first step or first axial displacement signal operating means). In addition, axial displacement which will be caused in the motor 1 by a control constant in the frequency arithmetic unit 15 that creates the frequency direction $\omega_1^*$ based upon the axial displacement signals is estimated as the second axial displacement signal $\Delta\theta c2$ (a second step or second axial displacement signal estimating means). The third axial displacement signal $\Delta\theta c3$ (=$\Delta\theta c1+\Delta\theta c2$) acquired by adding the first and second axial displacement signals is input to the frequency arithmetic unit 15 (a third step or third axial displacement signal input means).

As a result, even if it is the frequency arithmetic unit 15 of an insufficient control response angular frequency $\omega c_{PLL}$, the quantity of axial displacement which will be caused by the insufficiency is estimated as the second axial displacement signal $\Delta\theta c2$ and is added to the input of the frequency arithmetic unit 15. Therefore, in the control system by this embodiment, the first axial displacement signal $\Delta\theta c1$ expressing the axial displacement of the actual synchronous motor 1 is stable at a value substantially close to zero. As a result, high-precision torque control can be also realized in acceleration/deceleration.

That is, high-precision torque control proportional to q-axis current Iq can be realized by executing "(1) voltage control and (2) phase control" described above as shown in the expression (1)

Figure 5:
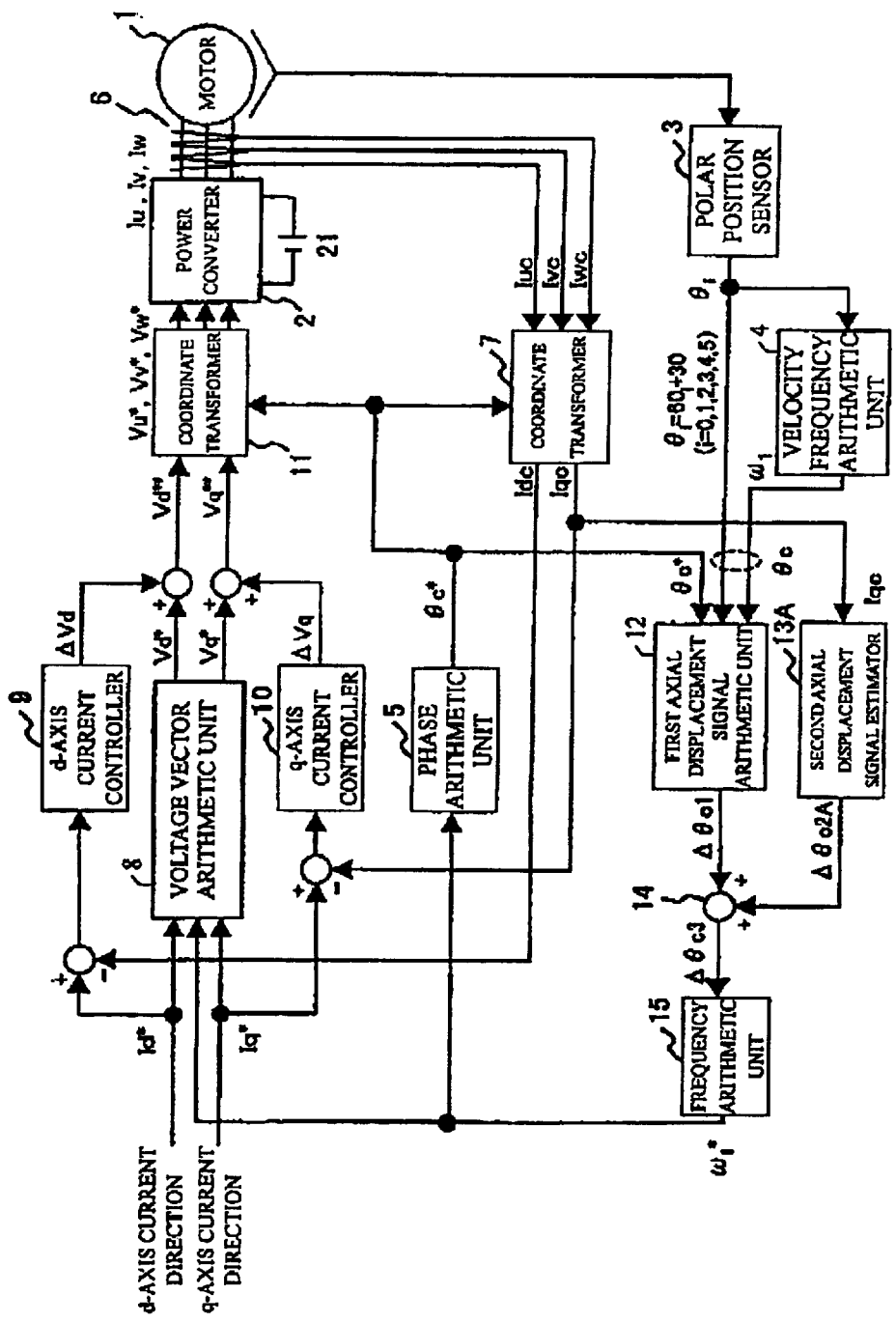
FIG. 5 is a block diagram showing a control device of a permanent-magnet type synchronous motor equivalent to a second embodiment of the invention.

Second Embodiment:

FIG. 5 is a block diagram showing the configuration of a control device of a permanent-magnet type synchronous motor equivalent to a second embodiment of the invention. The second embodiment is different from the first embodiment in that a second axial displacement signal ($\Delta\theta c2$) estimator 13A to which a q-axis current sensed value Iqc is input is used. In the first embodiment, the velocity frequency $\omega_1$ is input to the second axial displacement signal ($\Delta\theta c2$) estimator 13 and the second axial displacement signal $\Delta\theta c2$ is estimated using the control response angular frequency $\omega c_{PLL}$ of the frequency arithmetic unit 15. However, in the second embodiment, the motor torque is operated based upon the q-axis current sensed value Ilc, proportional gain is multiplied by the torque operated value, a first-order lag process is executed and a second axial displacement signal $\Delta\theta c2A$ is estimated. That is, when load torque $\tau_L$ is small, the similar effect of operation to that in the expression (19) is acquired if an expression (21) is operated using the q-axis current sensed value Iqc in place of an estimated value $\hat{\tau}$ of differential torque.

$$\Delta\theta c2A = -\frac{\left(\frac{3}{2} \cdot P_m \cdot Ke^* \cdot Iqc\right) \cdot \frac{1}{J^*} \cdot P_m \cdot \frac{N}{\omega c_{PLL}^2}}{1 + \frac{N}{\omega c_{PLL}} \cdot s} \quad (21)$$

Besides, if a constant in the expression (21) is expressed using K and T and the expression (21) is simplified, an expression (22) is acquired.

$$\Delta\theta c2A = -\frac{K \cdot s}{1 + T \cdot s} \cdot Iqc \quad (22)$$

Figure 6:
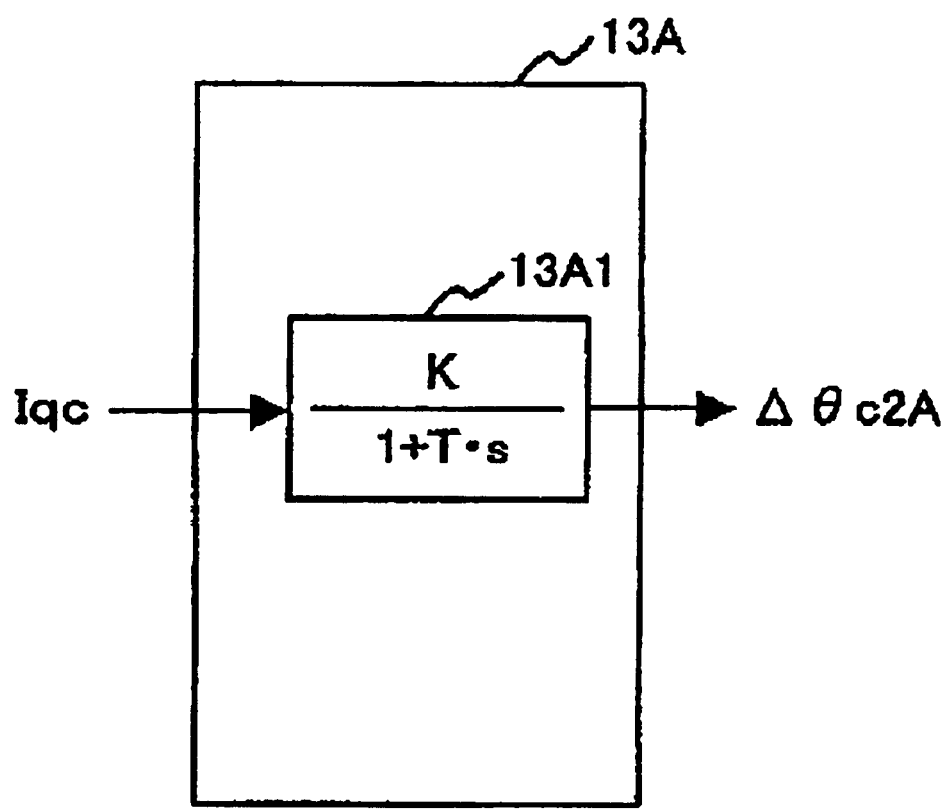
FIG. 6 shows the concrete configuration of a second axial displacement signal estimator 13A in the control device shown in FIG. 5.

FIG. 6 shows the concrete configuration of the second axial displacement signal ($\Delta\theta c2A$) estimator 13A in the second embodiment, the proportional gain K is multiplied in an arithmetic unit (proportion and first-order lag processing means) 13A1, a first-order lag process of the time constant T is executed and the second axial displacement signal $\Delta\theta c2A$ is operated.

In this embodiment, the q-axis current sensed value Iqc is used, however, even if its directed value Iq* is used, the similar effect is acquired.

Figure 7:
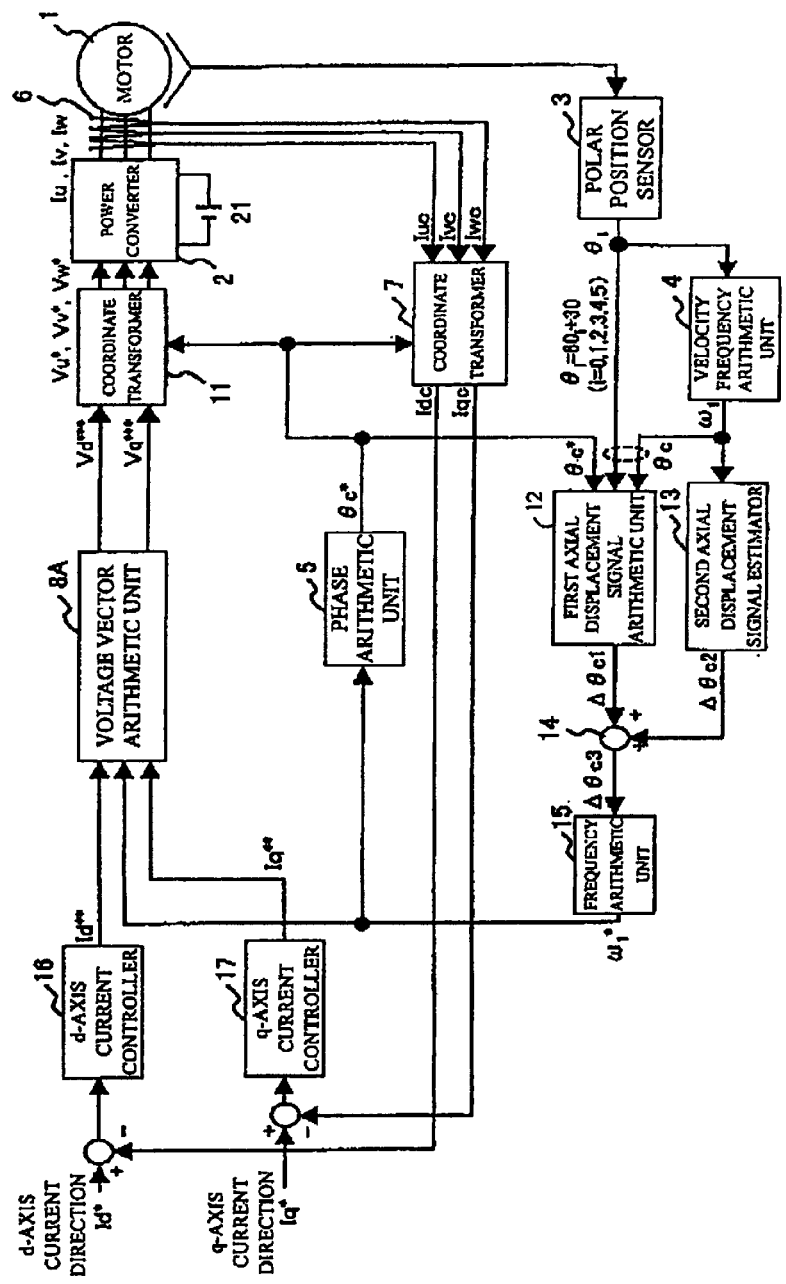
FIG. 7 is a block diagram showing a control device of a permanent-magnet type synchronous motor equivalent to a third embodiment of the invention.

Third Embodiment:

FIG. 7 is a block diagram showing the configuration of a control device of a permanent-magnet type synchronous motor equivalent to a third embodiment of the invention. This embodiment is different from the first embodiment in configuration for acquiring d-axis and q-axis voltage directions input to a coordinate transformer 11 based upon d-axis and q-axis current directions and the other is completely the same. As shown in FIG. 7, a voltage vector arithmetic unit 8A operates voltage reference values Vd*, Vq* based upon a motor constant, second current directed values Id, Iq and a frequency directed value $\omega_1^*$. A d-axis current direction arithmetic unit 16 outputs the second d-axis current directed value Id** according to deviation between a d-axis current directed value Id* and its sensed value Idc. Similarly, a q-axis current direction arithmetic unit 17 outputs the second q-axis current directed value Iq** according to deviation between a q-axis current directed value Iq* and its sensed value Iqc.

The voltage reference values Vd*, Vq* expressed in an expression (23) are operated using the second current directed values Id, Iq and the output voltage of a converter is controlled.

$$\begin{cases} Vd^{***} = R_1^* \cdot Id^{**} - \omega_1^* \cdot Lq^* \cdot Iq^{} \\ Vq^{*} = R_1^* \cdot Iq^{**} + \omega_1^* \cdot Ld^* \cdot Id^{**} + \omega_1^* \cdot Ke^* \end{cases} \quad (23)$$

To consider that Id* and Idc, and Iq* and Iqc also accord in such a method, it is clear that the similar effect to that in the first embodiment is acquired.

Figure 8:
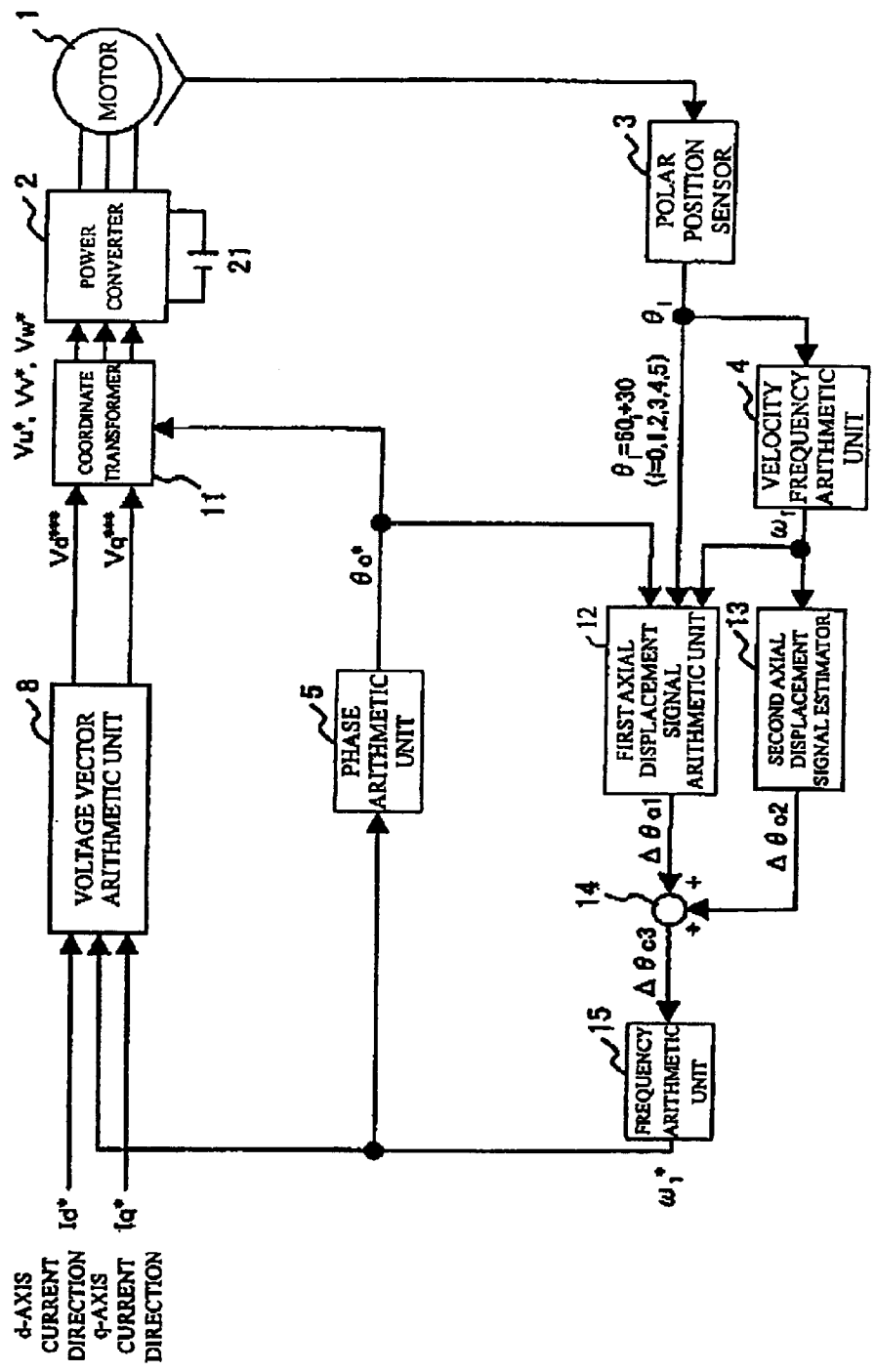
FIG. 8 is a block diagram showing a control device of a permanent-magnet type synchronous motor equivalent to a fourth embodiment of the invention.

Fourth Embodiment:

FIG. 8 is a block diagram showing the configuration or a control device of a permanent-magnet type synchronous motor equivalent to a fourth embodiment of the invention. This embodiment is different only in that the d-axis and q-axis current controllers 9, 10 shown in FIG. 1 are omitted and the configuration of the other is completely the same as that in FIG. 1.

In such a method, a slight error also occurs between Id* and Idc and between Iq* and Iqc, however, it is clear that the similar effect to that in the first embodiment is acquired. Further, current directed values Id*, Iq* are used for input to a voltage vector arithmetic unit 8; however, even if these are changed to current sensed values Idc, Iqc, the similar effect is acquired.

Figure 9:
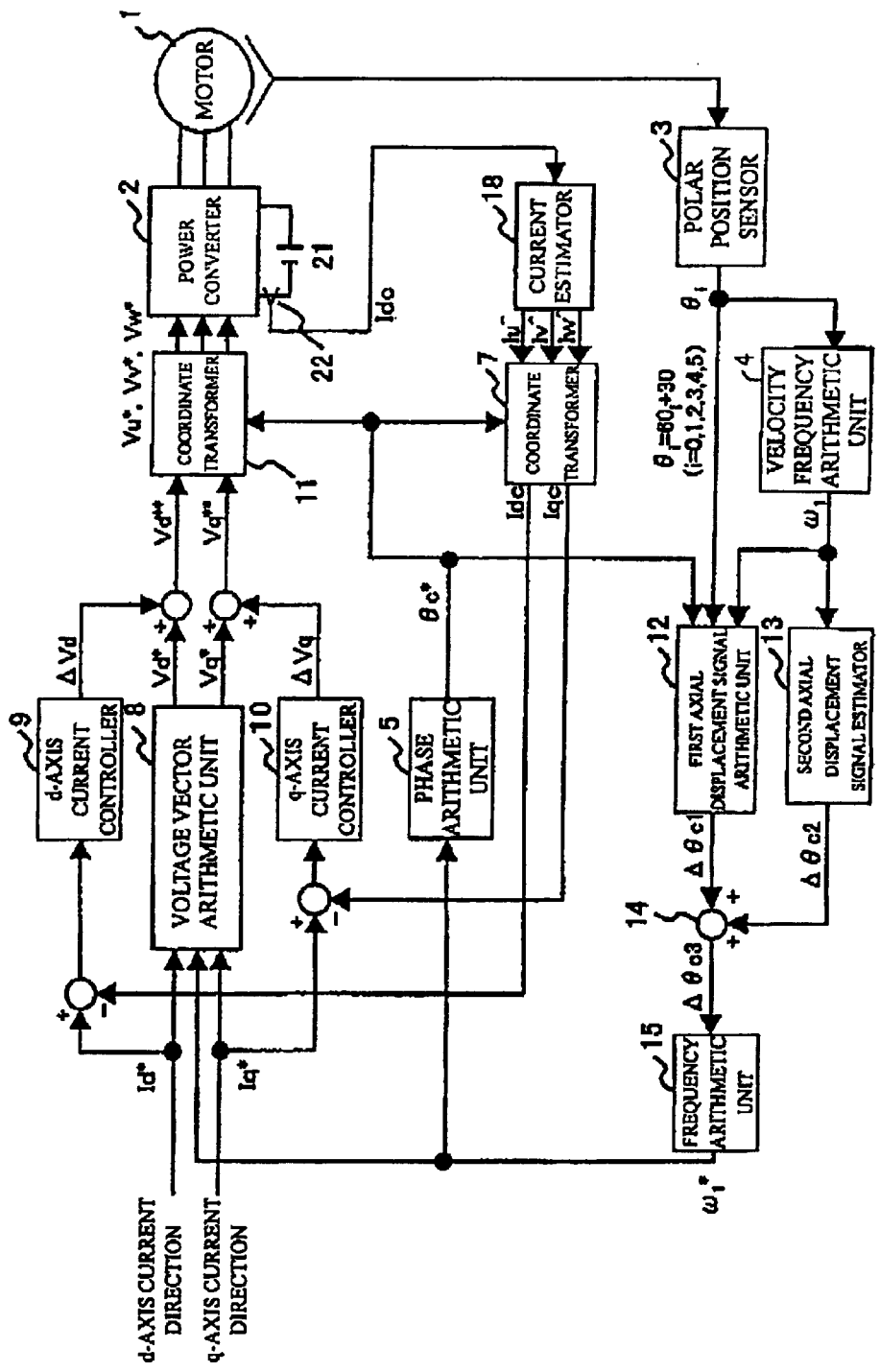
FIG. 9 is a block diagram showing a control device of a permanent-magnet type synchronous motor equivalent to a fifth embodiment of the invention.

Fifth Embodiment:

FIG. 9 is a block diagram showing the configuration of a control device of a permanent-magnet type synchronous motor equivalent to a fifth embodiment of the invention. The first to fourth embodiments adopt the method of utilizing three-phase alternating currents Iu to 1w sensed by the high-priced current sensor 6; however, this embodiment can be also applied in a control device that executes low-priced current sensing.

FIG. 9 is different from FIG. 1 only in configuration for estimating three-phase alternating currents Iu, Iv, Iw fed to the synchronous motor based upon the output Idc of a direct current sensor 22 in current estimating means (a current estimator) 18 and acquiring alternating current estimated values Iu^, Iv^, Iw^. "d-axis and q-axis current sensed values" Idc, Iqc are operated using these estimated current values Iu^, Iv^, Iw^ in a coordinate transformer 7. As Id* and Idc, and Iq* and Iqc also accord in such a method, it is clear that the control device is operated as in the embodiments and the similar effect is acquired.

Figure 10:
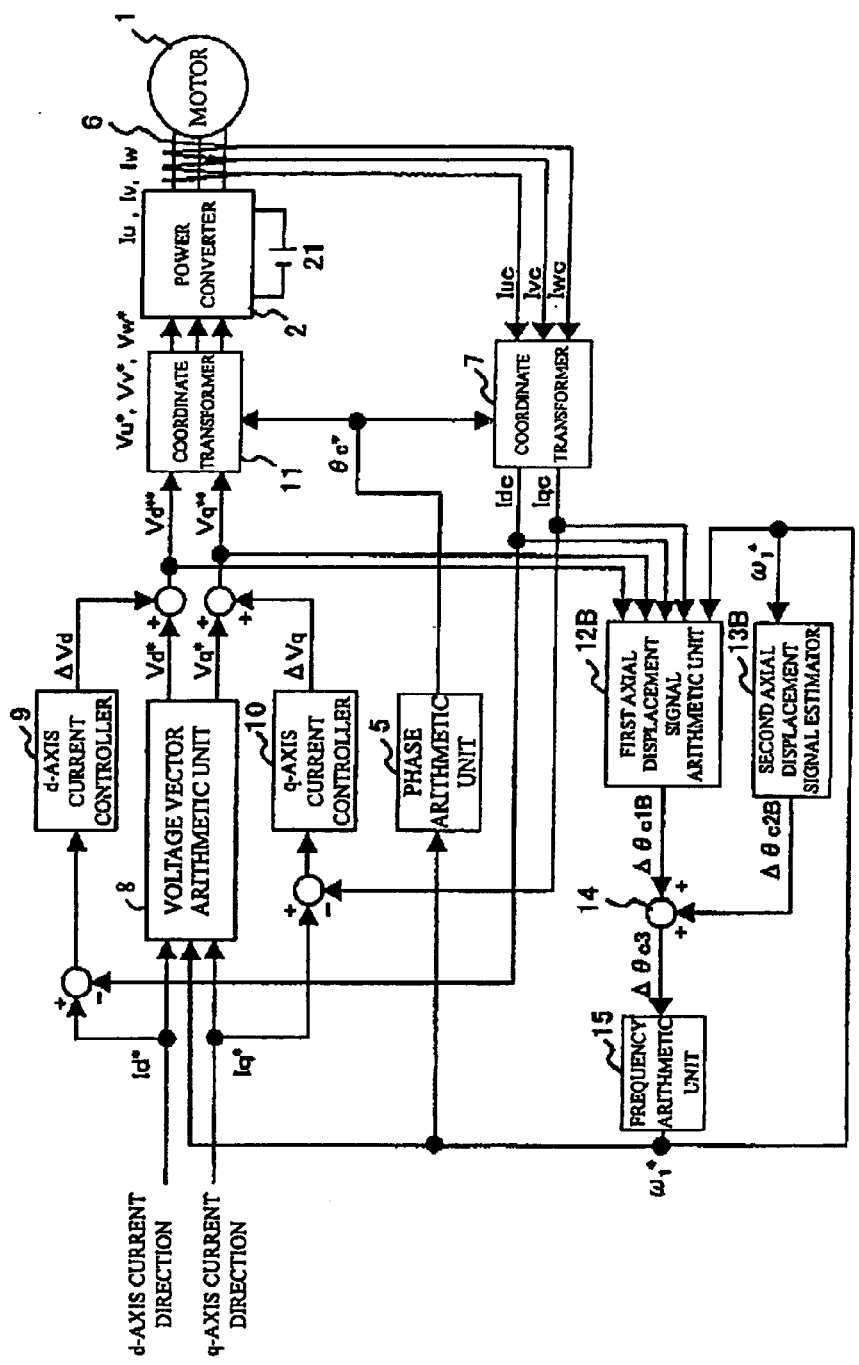
FIG. 10 is a block diagram showing a control device of a permanent-magnet type synchronous motor equivalent to a sixth embodiment of the invention.

Sixth Embodiment:

FIG. 10 is a block diagram showing the configuration of a control device of a permanent-magnet type synchronous motor equivalent to a sixth embodiment of the invention. The first to the fifth embodiments adopt the method of operating a rotational phase based upon the positional sensed value θi sensed by the polar position sensor 3 using the velocity frequency $\omega_1$ and operating the first axial displacement signal Δθc1 based upon deviation between its operated value θc and the rotational phase direction θc*. However, the invention can be also applied to a low-priced control device in which the polar position sensor is omitted.

FIG. 10 is different from FIG. 1 first in that a first axial displacement signal Δθc1B is operated based upon a current signal and a voltage signal of the synchronous motor by vector operation in place of the polar position sensor. Next, a second axial displacement signal estimator 13B estimates a second axial displacement signal A θc2B based upon a frequency directed value $\omega_1$* in place of the velocity frequency $\omega_1$.

A first axial displacement signal arithmetic unit 12B operates the first axial displacement signal Δθc1B which is deviation between the rotational phase direction θc* and a rotational phase θc based upon voltage directed values Vd, Vq, current sensed values Idc, Iqc and the frequency directed value $\omega_1$*. Concretely, the first axial displacement signal arithmetic unit 12B operates the first axial displacement signal a Δθc1B (=θc*−θc) which is deviation between the rotational phase direction θc* and the rotational phase θc according to an expression (24). The expression (24) is equivalent to an axial displacement operating method also described in the operation control method without a position sensor disclosed in the patent document 2.

$$\Delta\theta c1B = \tan^{-1}\left(\frac{Vd^{**} - R_1^* \cdot Id_c + \omega_1^* \cdot Lq^* \cdot Iq_c}{Vq^{**} - R_1^* \cdot Iq_c - \omega_1^* \cdot Lq^* \cdot Id_c}\right) \quad (24)$$

Figure 11:
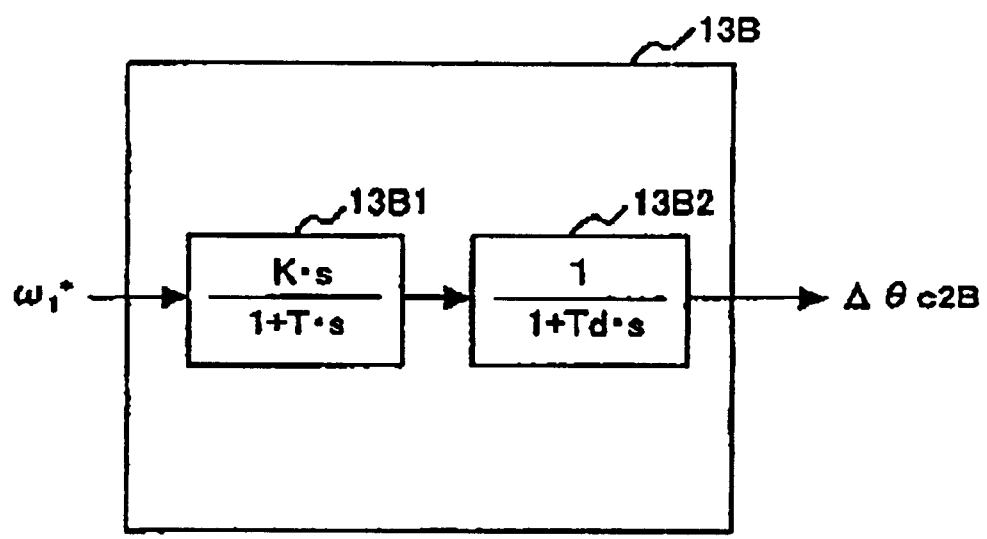
FIG. 11 shows the concrete configuration of a second axial displacement signal estimator 13B in the control device shown in FIG. 10.

FIG. 11 is a block diagram showing the second axial displacement signal estimator 13B. The frequency directed value $\omega_1$* is input to the second axial displacement signal estimator 13B. The frequency direction $\omega_1$* is input to an incomplete differential arithmetic unit 13B1 having the gain of K and a lag time constant of T and its output signal is further input to a first-order lag filter 13B2 having a lag time constant of Td. The estimator 13B estimates the second axial displacement signal Δθc2B according to an expression (25) and outputs it.

$$\Delta\theta c2B = -\frac{K \cdot s}{1 + T \cdot s} \cdot \frac{1}{1 + Td \cdot s} \cdot \omega_1^* \quad (25)$$

The first-order lag filter 13B2 is provided to remove a high-frequency component.

High-precision torque control can be also realized in this method by adding the first axial displacement signal Δθc1B and the second axial displacement signal Δθc2B in an adder 14.

Figure 12:
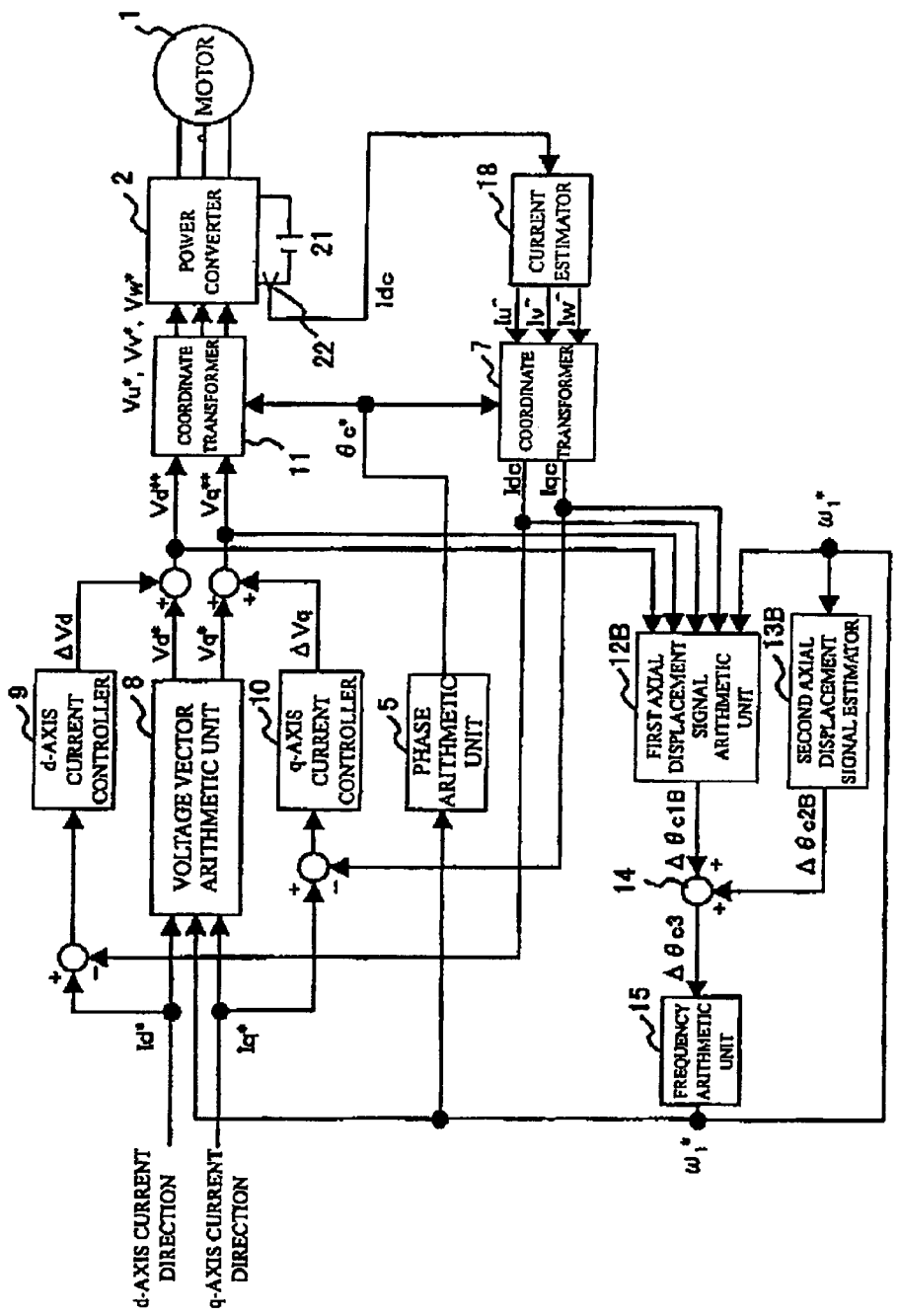
FIG. 12 is a block diagram showing a control device of a permanent-magnet type synchronous motor equivalent to a seventh embodiment of the invention.

Seventh Embodiment:

FIG. 12 is a block diagram showing the configuration of a control device of a permanent-magnet type synchronous motor equivalent to a seventh embodiment of the invention. In this embodiment, the polar position sensor is omitted and the invention is applied to a control device using a low-priced current sensor. FIG. 12 is different from FIG. 10 in configuration in which three-phase current estimated values of alternating current Iu^, Iv^, Iw^ are acquired by a direct current sensor 22 in place of the alternating current sensor 6 and a current estimator 18 to which a direct current sensed value Idc which is its output is input. "d-axis and q-axis current sensed values idc, iqc are operated using these estimated current values Iu^, Iv^, Iw^ in a coordinate transformer 7.

It is clear that the motor is also operated in such a method as in the sixth embodiment and the similar effect is acquired.

Besides, in this embodiment, d-axis and q-axis current controllers 9, 10 are added, however, this embodiment can be also applied to a method in which the current controllers are not added. Further, as shown in FIG. 7, current directed values Id, Iq for a second d-axis and a second q-axis are operated based upon current directed values Id*, Iq* of a first d-axis and a first q-axis and each current sensed value Idc, Iqc, and the similar effect is also acquired in a method of operating an output voltage directed value based upon these current directed values.

According to the invention, the control method or the control device of the permanent-magnet type synchronous motor that can also realize high-precision torque control in the acceleration/deceleration of the motor can be provided.

What is claimed is:

1. A control method of a permanent-magnet type synchronous motor provided with a frequency arithmetic unit of alternating current fed to the motor so that axial displacement is reduced based upon the axial displacement of the permanent-magnet type synchronous motor and a power converter that feeds alternating current of a variable frequency and variable voltage to the motor according to d-axis and q-axis output voltage directions based upon its frequency direction and a rotational phase direction, comprising:

a first step for operating axial displacement which is difference between the rotational phase direction and an actual rotational phase of the motor using a frequency or current information acquired from a control system as a first axial displacement signal;

a second step for estimating axial displacement caused in the motor by a control response angular frequency in the frequency arithmetic unit as a second axial displacement signal; and a third step for inputting a third axial displacement signal acquired by adding the first and second axial displacement signals to the frequency arithmetic unit.

2. A control method of a permanent-magnet type synchronous motor provided with a frequency arithmetic unit that creates a frequency direction of alternating current fed to the motor based upon the axial displacement of the permanent-magnet type synchronous motor and a power converter that feeds alternating current of a variable frequency and variable voltage to the motor based upon the frequency direction, comprising:

a first step for operating axial displacement which is difference between a rotational phase direction and an actual rotational phase of the motor using information acquired from a control system as a first axial displacement signal;

a second step for estimating axial displacement caused in the motor in relation to the frequency arithmetic unit as a second axial displacement signal; and a third step for inputting a third axial displacement signal acquired by adding the first and second axial displacement signals to the frequency arithmetic unit.

3. A control method of a permanent-magnet type synchronous motor according to claim 2, wherein:

the second step includes a step for inputting information related to a frequency or current acquired from a control system and estimating the second axial displacement signal using a control constant of the frequency arithmetic unit.

4. A control method of a permanent-magnet type synchronous motor according to claim 2, wherein:
the second step includes a step for differentiating a velocity frequency or a frequency direction acquired based upon a polar position sensed value of the motor, multiplying by a factor of proportionality, executing a first-order lag process and estimating the second axial displacement signal.

5. A control method of a permanent-magnet type synchronous motor according to claim 2, wherein:
the second step includes a step for inputting a current value or its directed value of a q-axis (equivalent to a torque axis) of a rotatory coordinate system calculated based upon a sensed value of current flowing in the motor and the rotational phase direction and estimating the second axial displacement signal in consideration of a control constant in the frequency arithmetic unit.

6. A control method of a permanent-magnet type synchronous motor according to claim 2, wherein:
the second step further includes a step for executing a first-order lag process.

7. A control method of a permanent-magnet type synchronous motor according to claim 2, wherein:
the first step includes a step for operating a rotational phase signal of the motor based upon a polar position sensed signal of the motor and a step for operating the first axial displacement signal based upon deviation between the rotational phase direction and the rotational phase signal.

8. A control method of a permanent-magnet type synchronous motor according to claim 2, wherein:
the first step includes a step for operating the first axial displacement signal based upon d-axis and q-axis output voltage directions, a sensed value of current flowing in the motor and the frequency direction.

9. A control method of a permanent-magnet type synchronous motor according to claim 2, wherein:
the-first step includes a step for operating current values of the d-axis and the q-axis based upon a sensed value of current flowing in the motor and the rotational phase direction and a step for operating the first axial displacement signal based upon the current values of the d-axis and the q-axis, the output voltage direction and the frequency direction.

10. A control method of a permanent-magnet type synchronous motor according to claim 2, comprising:
a step for operating the rotational phase direction by differentiating the frequency direction.

11. A control device of a permanent-magnet type synchronous motor provided with the permanent-magnet type synchronous motor, a frequency arithmetic unit that creates a frequency direction of alternating current fed to the motor based upon axial displacement in the motor for a rotational phase direction and a power converter that feeds alternating current of a variable frequency and variable voltage to the motor according to output voltage direction of a d-axis and a q-axis based upon the frequency direction and the rotational phase direction, comprising:
first axial displacement signal operating means for operating axial displacement which is difference between the rotational phase direction and a phase of a rotor of the motor using information acquired from a control system to be a first axial displacement signal;
second axial displacement signal estimating means for estimating axial displacement caused in the motor in relation to the frequency arithmetic unit as a second axial displacement signal; and
means for inputting a third axial displacement signal acquired by adding the first and second axial displacement signals to the frequency arithmetic unit.

12. A control device of a permanent-magnet type synchronous motor according to claim 11, wherein:
the second axial displacement signal estimating means is provided with means for inputting a signal related to a frequency or current acquired from a control system and estimating the second axial displacement signal using a control constant in the frequency arithmetic unit.

13. A control device of a permanent-magnet type synchronous motor according to claim 11, wherein:
the second axial displacement signal estimating means is provided with means for differentiating a velocity frequency or a frequency direction calculated based upon a polar position sensed value of the motor, multiplying by a factor of proportionality, executing a first-order lag process and estimating the second axial displacement signal.

14. A control device of a permanent-magnet type synchronous motor according to claim 11, wherein:
the second axial displacement signal estimating means is provided with means for inputting a current value or its directed value of a q-axis (equivalent to a torque axis) of a rotatory coordinate system calculated based upon a sensed value of current flowing in the motor and the rotational phase direction and estimating the second axial displacement signal in consideration of a control constant in the frequency arithmetic unit.

15. A control device of a permanent-magnet type synchronous motor according to claim 11, wherein:
the second axial displacement signal estimating means is further provided with first-order lag processing means.

16. A control device of a permanent-magnet type synchronous motor according to claim 11, wherein:
the first axial displacement signal operating means is provided with means for operating a rotational phase signal of the motor based upon a polar position sensed signal of the motor and means for operating the first axial displacement signal based upon deviation between the rotational phase direction and the rotational phase signal.

17. A control device of a permanent-magnet type synchronous motor according to claim 11, wherein:
the first axial displacement signal operating means is provided with means for operating the first axial displacement signal based upon the output voltage directions of the d-axis and the q-axis, a sensed value of current flowing in the motor and the frequency direction.

18. A control device of a permanent-magnet type synchronous motor according to claim 11, wherein:
the first axial displacement signal operating means is provided with means for operating current values of the d-axis and the q-axis based upon a sensed value of current flowing in the motor and the rotational phase direction and means for operating the first axial displacement signal based upon the current values of the d-axis and the q-axis, the output voltage direction and the frequency direction.

19. A control device of a permanent-magnet type synchronous motor according to claim 11, wherein:

the first axial displacement signal operating means is provided with a direct current sensor for sensing direct current flowing from a direct-current power supply to the power converter, current estimating means for estimating an each-phase current value of the motor based upon a direct current sensed value and means for operating current values of the d-axis and the q-axis based upon an each-phase current estimated value and the rotational phase direction.

20. A control device of a permanent-magnet type synchronous motor according to claim 11, further comprising:

means for operating the rotational phase direction by differentiating the frequency direction.

* * * * *